Figures 1, 2:
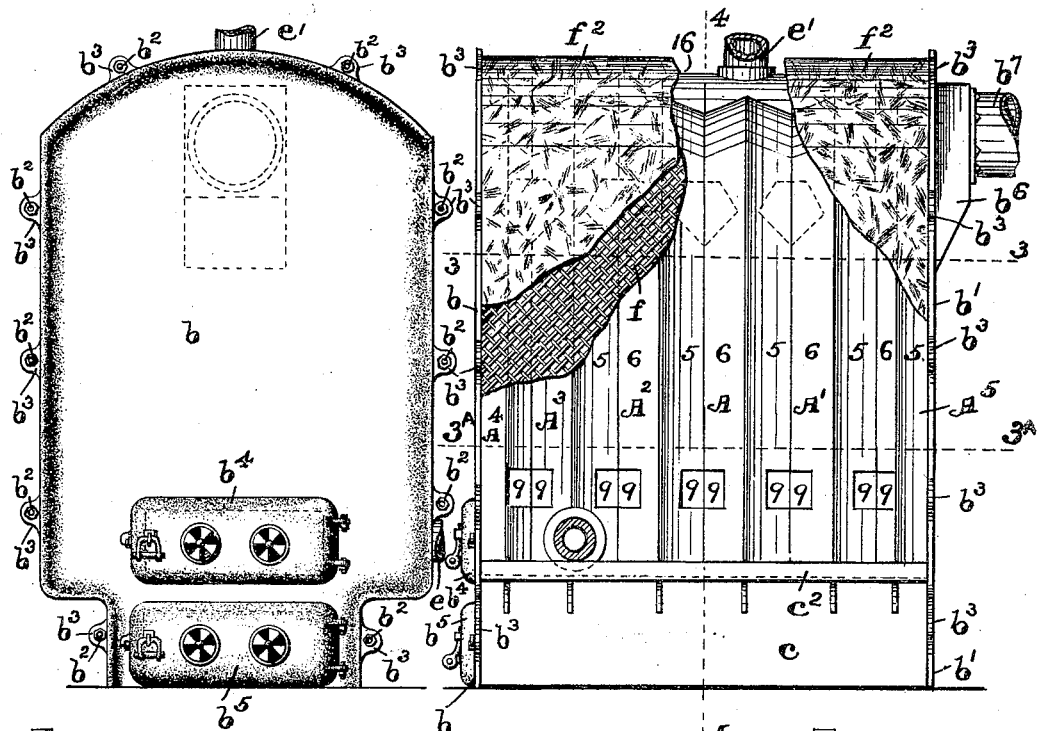

No. 642,352. Patented Jan. 30, 1900.
W. T. MIXSELL.
GENERATOR.
Application filed June 9, 1899.

(No Model.) 2 Sheets—Sheet 1.

WITNESSES:
Walter H. Talmage.
Marcy J. Trusdell

INVENTOR:
WARD TEMPLE MIXSELL
BY
Fred C. Fraentzel,
ATTORNEY

THE NORRIS PETERS CO., PHOTO-LITHO., WASHINGTON, D. C.

No. 642,352. Patented Jan. 30, 1900.
W. T. MIXSELL.
GENERATOR.
(Application filed June 9, 1899.)
(No Model.) 2 Sheets—Sheet 2.
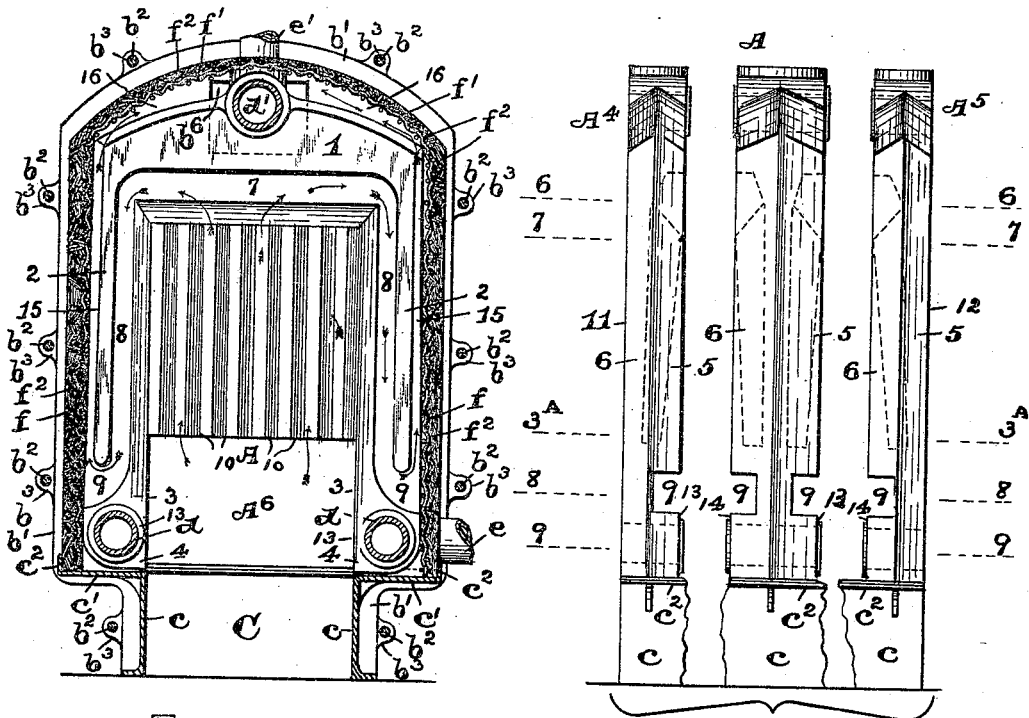
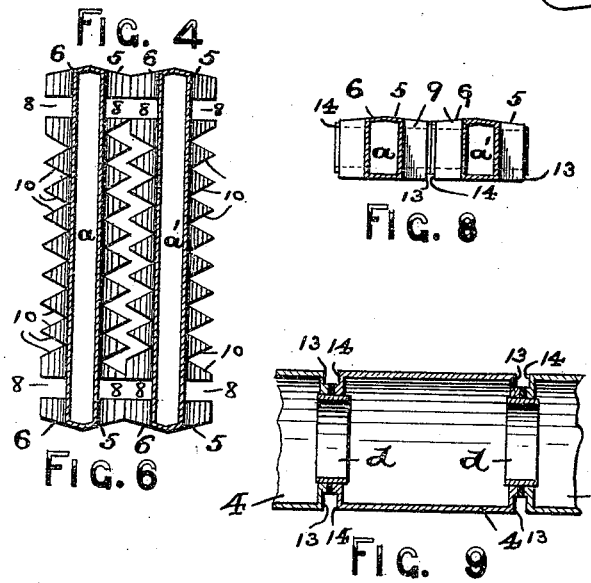
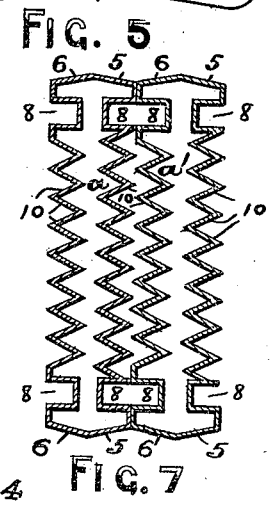
WITNESSES:
INVENTOR:
WARD TEMPLE MIXSELL,
BY
Fred C. Fraentzel,
ATTORNEY

UNITED STATES PATENT OFFICE.

WARD TEMPLE MIXSELL, OF JERSEY CITY, NEW JERSEY.

GENERATOR.

SPECIFICATION forming part of Letters Patent No. 642,352, dated January 30, 1900.

Application filed June 9, 1899. Serial No. 719,900. (No model.)

*To all whom it may concern:*

Be it known that I, WARD TEMPLE MIXSELL, a citizen of the United States, residing at Jersey City, in the county of Hudson and State of New Jersey, have invented certain new and useful Improvements in Generators; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

This invention relates to improvements in hot-water generators or steam-heaters; and my invention has for its principal objects the production of a simple and practical construction, the heating-sections which constitute the generator being of such a construction that a greater heating-surface is obtained for a minimum amount of space occupied by the sections because of the consolidation of variously-spaced and additional heating-surfaces, all arranged in the same space occupied by the heater-sections as now generally made.

A further object of my present invention is to provide a novel construction of generator of the character above set forth in which a direct upward and vertical passage for the flames and hot gases is produced between the flues formed by the abutting heater-sections, and to provide a large area of flue-space in the proper proportion required for the passage of the gases, but the arrangement and construction of the flue-passages are such that the passage of the hot gases and flames will be sufficiently retarded to provide a greater opportunity in time for the extraction of the heat and transmittance of the same directly beneath the upper crown portion of each heater-section for the effective heating of that body of water farthest away from the fire-chamber of the generator.

A further and important object of this invention is to provide an arrangement of vertically-disposed flues extending laterally and directly above the fire-chamber, which terminate in horizontal flues directly beneath the crown portion of the generator, and an arrangement of downwardly-extending flues leading from said horizontal flues at the sides of the generator, said downwardly-extending flues communicating at or near the bottom of the generator with flue-passages for taking off the gases and smoke into the smoke stack or pipe connected with the generator.

A further object of this invention is to produce an arrangement of heater-sections the outer edges of which are of an angular or similar shape to provide, with the casing, jacket, or covering of the complete generator, vertical flue-spaces, all formed by placing the heating-sections against each other, as will be hereinafter fully set forth.

Finally, my invention has for its primary objects to provide a hot-water or steam generator having constant and evenly-distributed draft conditions to produce a more even combustion and to provide a greater area of flue-passage at the bottom than near the top, whereby the circulation of water or steam globules within the heater-sections is directly vertical and unimpeded by obstructions, for the reason that the slanting surfaces of the heater-sections, forming a smaller flue-space at the top than at the bottom between every two heater-sections, will provide a greater cross-area within each heater-section at the top than at the bottom, causing a quicker and greater circulation of water.

Other objects of the invention not here specifically set forth will be evident from the following description of the construction and arrangement of the several parts of the hot-water or steam generating apparatus.

With these several ends in view the invention consists generally in the novel construction of hot-water or steam generator to be hereinafter fully described; and, furthermore, this invention consists in the several novel arrangements and combinations of parts, as well as in the details of the construction thereof, all of which will be fully set forth in the accompanying specification and finally embodied in the clauses of the claim.

My invention is clearly illustrated in the accompanying drawings, in which—

Figures 3, 3A:
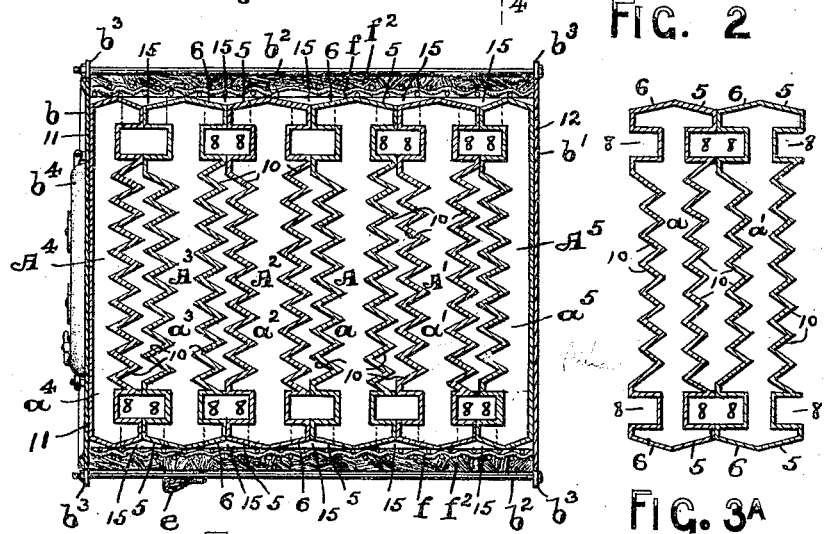

Figure 1 is a front view of my novel construction of generator, and Fig. 2 is a side view of the same with portions of the jacket or covering arranged over the heating-sections being broken away to illustrate in side elevation the arrangement of the said heater-sections. Fig. 3 is a horizontal section of the component parts of the generator, said section being taken on line 3 3 in Fig. 2; and Fig. 3^A is a horizontal section of a pair of the intermediate heater-sections, taken on lines 3^A 3^A in Fig. 2 or Fig. 5. Fig. 4 is a vertical cross-section of the generator, said section being taken on line 4 4 in Fig. 2. Fig. 5 represents three edge views of the respective end heater-sections and one of the intermediate heater-sections and portions of the ash-pit box on which said sections are arranged. Fig. 6 is a horizontal section of a pair of the intermediate heater-sections, the section being taken on line 6 6 in Fig. 5; and Fig. 7 is a similar section of the said pair of heater-sections, taken on line 7 7 in said Fig. 5. Fig. 8 is a horizontal section, taken on line 8 8 in said Fig. 5, of the leg portions of a pair of heating-sections on one side of the fire-box; and Fig. 9 is a similar section, on an enlarged scale, taken on line 9 9 in said Fig. 5.

Similar letters and numerals of reference are employed in all of the said above-described views to indicate corresponding parts.

As will be seen from Figs. 2 and 3, my novel construction of generator consists of any suitable number of heating-sections, as A, A', A$^2$, and A$^3$, and the front end section A$^4$ and rear end section A$^5$, all arranged one in advance of the other and secured between the front plate or frame $b$ and the rear plate of frame $b'$ by means of tie bolts or rods $b^2$, arranged in perforated ears or lugs $b^3$ on said plates $b$ and $b'$; but of course it will be evident that any other well-known fastening means or other manner of arranging said rods $b^2$ may be employed. When the several heater-sections and the said plates or frames $b$ and $b'$ are thus secured together, they will form a combustion or fire chamber A$^6$, the leg portions of the said heater-sections being arranged upon shelves $c'$, connected with the sides $c$ of a metal box, which when arranged between said plates $b$ and $b'$ forms the ash-pit C of the generator. Each shelf $c'$ is preferably formed with an upwardly-extending rib or shoulder $c^2$, which extends upwardly along the ends of the several heater-sections to prevent accidental lateral displacement of said sections above the frame or box which forms the said ash-pit. In the said front plate $b$ are the usual openings, over which are hinged any of the well-known forms of fire-box door $b^4$ and ash-pit door $b^5$, and the back or rear plate or frame $b'$ has a smoke-box $b^6$, to which is secured a smoke-pipe $b^7$, substantially as indicated in Fig. 2.

The several heater-sections A, A', A$^2$, and A$^3$ are all hollow to form upright fluid-containing chambers $a$, $a'$, $a^2$, and $a^3$, and the end heater-sections A$^4$ and A$^5$ are respectively provided with fluid-containing chambers $a^4$ and $a^5$.

From an inspection of Figs. 2, 3, and 4 it will be seen that the several heater-sections A, A', A$^2$, and A$^3$ are provided on opposite sides with the flat surfaces 1 at the top and the vertically-disposed surfaces 2 and 3, which are also made flat, and at the bottom, at each side, each heater-section has a leg portion 4 for supporting the section upon the shelves $c'$ of the ash-pit box C and to provide the combustion or fire chamber A$^6$ above mentioned. The ends of the various heater-sections are formed with angularly or similarly disposed surfaces 5 and 6, and in the upper flat surface 1 of each section is a horizontal duct or passage-way 7, which is in communication at its ends with vertical ducts or passage-ways 8, formed in the vertically-disposed surfaces 2 and 3, each duct 8 terminating at the bottom in the leg portions 4 of the said heater-sections in an opening or outlet 9. Contiguous with the flat-surface portions 3 of each heater-section the laterally-extending walls directly above the fire-box or combustion-chamber A$^6$ are preferably made as indicated more particularly in Figs. 3, 4, 6, and 7, the surrounding sides being provided with angular or similarly-arranged surfaces 10, forming a series of vertical channels which are preferably made V-shaped in cross-section; but they may be of any other suitable configuration, as will be clearly understood. The said channel-shaped surfaces 10 are preferably made tapering, as indicated in dotted outline in the several heating-sections represented in Fig. 5, whereby the fluid-containing chamber within each heating-section has a larger cross-area at or near the top than at the bottom, as clearly illustrated in Figs. 3 and 7, while the vertical flue-spaces formed between each two adjacent heating-sections will be of a smaller cross-area at the top near the horizontal duct or passage-way 7 than at the bottom and just above the combustion-chamber A$^6$.

The two end heater-sections A$^4$ and A$^5$ are constructed in a similar manner, as will be seen from an inspection of Figs. 2, 3, and 5, except that their inner sides are made as above set forth and that the outer sides 11 and 12 of the respective sections A$^4$ and A$^5$ are preferably made flat to permit the arranging of the end plates or frames $b$ and $b'$ against said flat surfaces of the heater-sections A$^4$ and A$^5$ in the manner illustrated in the several figures of the drawings.

As illustrated more particularly in Figs. 4 and 9 of the drawings, each leg portion 4 of the heater-sections A, A', A$^2$, and A$^3$ is provided with a suitable opening in the opposite walls 13 and 14 of said portions, and the end heater-sections A$^4$ and A$^5$ are provided in their leg portions, but in the inner side of each of said last-mentioned sections, with similarly-formed holes, and when said several sections are assembled to produce the generator a short tube $d$ is arranged in a manner so as to connect each two adjacent sections, and thereby establish a water communication between the water-chambers of the heating-sections at each side of the combustion-chamber $A^6$. In like manner the several heating-sections are provided with openings in their sides at or near the top, a short tube $d'$ being arranged in such a manner that communication is established between the upper parts of the several heater-sections comprising the generator. An inlet-pipe $e$ leads into one or more of said heating-sections at one or both sides of the generator for admission of water into the same, and $e'$ is an outlet-pipe for the hot water or steam from the upper part of the generator to enable a complete circulation of hot water or steam from the generator through a system of piping in the building for heating purposes and back again into the generator at the lowest point, as will be clearly understood.

When the several component heater-sections have been arranged one in advance of the other and have been secured together to prevent leakage at the joints, a casing $f$, preferably of mesh-wire or perforated sheet metal, is arranged against the apex of the angular sides 5 and 6 of the several heating-sections, thereby providing a series of vertical ducts or flues 15 at the sides of the generator, and above the upper parts of the assembled heating-sections I arrange a casing $f'$, which is also preferably made of wire mesh or perforated sheet metal, thereby providing in the top of the generator a chamber 16, which communicates with the smoke-box $b^6$ at the back of the generator, as will be clearly seen from an inspection of Fig. 4. Upon these casings $f$ and $f'$ I arrange a coating or covering $f^2$ of asbestos cement, which prevents the smoke and gases from passing through the openings in the casings $f$ and $f'$, and also prevents the loss of generated heat by radiation.

The construction and operation of my novel construction of generator will be easily understood upon reference to the foregoing description and the accompanying drawings, the smoke, flames, and heated gases passing from the combustion-chamber $A^6$ up the vertical and laterally-extending flues between the heating-sections A, A', $A^2$, $A^3$, $A^4$, and $A^5$ and into the horizontal ducts or passage-ways 7, formed directly beneath the dome or crown of each heating-section, thus employing the heated gases to the best advantage by causing them to act upon an increased area of heating-surface. From the horizontal ducts or passage-ways 7 the smoke and gases will pass into the downwardly-extending ducts or passage-ways 8 at the sides of the generator, and from the outlets 9 at the lower sides of the heating-sections the smoke and gases will pass into the ducts or flues 15 between the ends of the heating-sections and the casings $f$ and asbestos covering, and next into the chamber 16 at the top of the generator into the smoke-box $b^6$ and smoke-pipe $b^7$, all of which is clearly indicated by the arrows in said Fig. 4.

From the above description it will be evident that I have produced a simple and practical construction which can be economically manufactured and assembled owing to the low cost per pound of iron in molding and core-making, as the metal is consolidated into space which is smaller in three dimensions than heretofore, and owing to the channeled or zigzag arrangement of the lateral sides of the heating-sections stronger sections which will not buckle or burn out from excessive heat are thus made.

Of course it will be obvious that many changes may be made in the several arrangements and combinations of the various parts, as well as in the details of the construction thereof, without departing from the scope and spirit of my present invention. Hence I do not limit my invention to the exact arrangements and combinations of the parts as herein described, and illustrated in the accompanying drawings, nor do I confine myself to the exact details of the construction of the same.

Having thus described my invention, what I claim is—

1. A generator comprising upright heating-sections, arranged one in advance of the other, each section being formed with a fluid-heating chamber, vertically-arranged flues or fire-passages between said heating-sections, extending laterally and directly across the fire-surface, laterally-extending or horizontal flues or passage-ways near the top of said heating-sections, in communication with said vertical flues, downwardly-extending flues or ducts near the ends of said heating-sections, communicating at the top with the ends of said horizontal flues, angular or similarly-arranged surfaces at the ends of each heating-section, and a shell or casing arranged against and contacting with the pointed ends of said angular surfaces of the heating-sections, to provide vertically-arranged and upwardly-extending flues or passage-ways at the ends of said assembled heating-sections, substantially as and for the purposes set forth.

2. A generator comprising upright heating-sections, arranged one in advance of the other, each section being formed with a fluid-heating chamber, vertically-arranged flues or fire-passages between said heating-sections, extending laterally and directly across the fire-surface, laterally-extending or horizontal flues or passage-ways near the top of said heating-sections, in communication with said vertical flues, downwardly-extending flues or ducts near the ends of said heating-sections, communicating at the top with the ends of said horizontal flues, angularly or similarly arranged surfaces at the ends of each heating-section, a perforated shell or casing against said ends of the heating-sections, a covering of asbestos cement, or the like, over said perforated shell or casing, all arranged to provide vertical and upwardly-extending flues or passage-ways at the ends of said assembled heating-sections, substantially as and for the purposes set forth.

3. A generator comprising upright heating-sections arranged one in advance of the other, each section being formed with a fluid-heating chamber, vertically-arranged flues or fire-passages between said heating-sections, extending laterally and directly across the fire-surface, laterally-extending or horizontal flues or passage-ways near the top of said heating-sections, in communication with said vertical flues, downwardly-extending flues or ducts near the ends of said heating-sections, communicating at the top with the ends of said horizontal flues, angularly or similarly arranged surfaces at the ends of each heating-section, a shell or casing against the ends of said heating-sections, to provide vertically-arranged and upwardly-extending flues or passage-ways at the ends of said assembled heating-sections, and a shell or casing above said heating-sections, arranged to provide a chamber above said sections, substantially as and for the purposes set forth.

4. A generator comprising upright heating-sections arranged one in advance of the other, each section being formed with a fluid-heating chamber, vertically-arranged flues or fire-passages between said heating-sections, extending laterally and directly across the fire-surface, laterally-extending or horizontal flues or passage-ways near the top of said heating-sections, in communication with said vertical flues, downwardly-extending flues or ducts near the ends of said heating-sections, communicating at the top with the ends of said horizontal flues, angularly or similarly arranged surfaces at the ends of each heating-section, a perforated shell or casing against the ends of said heating-sections, a covering of asbestos cement, or the like, over said perforated shell or casing, arranged to provide vertical and upwardly-extending flues or passage-ways at the ends of said assembled heating-sections, a perforated shell or casing above said heating-sections, and a covering of asbestos cement, or the like, over said shell or casing, arranged to provide a chamber above said sections, substantially as and for the purposes set forth.

5. A generator comprising upright heating-sections arranged one in advance of the other, each section being formed with a fluid-heating chamber, vertically-disposed channels or angularly-formed sides to each heating-section, vertically-arranged flues or fire-passages between said heating-sections, formed by the said vertically-disposed channels in the sides of said heating-sections, said vertical flues or fire-passages extending laterally and directly across the fire-surface, laterally-extending or horizontal flues or passage-ways near the top of said heating-sections, in communication with said vertical flues, downwardly-extending flues or ducts near the ends of said heating-sections, communicating at the top with the ends of said horizontal flues, and vertically-arranged and upwardly-extending flues or passage-ways at the ends of said assembled heating-sections, substantially as and for the purposes set forth.

6. A generator comprising heating-sections arranged one in advance of the other, each section being formed with a fluid-heating chamber, and having their sides which are arranged adjacent to one another, tapering vertically, to provide vertically-arranged flues or fire-passages between said heating-sections, said flues or passages having a larger cross-area at their lowest points than at their highest points, substantially as and for the purposes set forth.

7. A generator comprising heating-sections arranged one in advance of the other, each section being formed with a fluid-heating chamber, and having their sides which are arranged adjacent to one another, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, and vertically-arranged and upwardly-extending flues or passage-ways at the ends of said assembled heating-sections, substantially as and for the purposes set forth.

8. A generator comprising heating-sections arranged one in advance of the other, each section being formed with a fluid-heating chamber, and having their sides which are arranged adjacent to one another, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, angularly or similarly arranged surfaces at the ends of each heating-section, and a shell or casing against said ends of the heating-sections, to provide vertically-arranged and upwardly-extending flues or passage-ways at the ends of said assembled heating-sections, substantially as and for the purposes set forth.

9. A generator comprising heating-sections arranged one in advance of the other, each section being formed with a fluid-heating chamber, and having their sides which are arranged adjacent to one another, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, angularly or similarly arranged surfaces at the ends of each heating-section, a perforated shell or casing against said ends of the heating-sections, a covering of asbestos cement, or the like, over said perforated shell or casing, all arranged to provide vertical and upwardly-extending flues or passage-ways at the ends of said assembled heating-sections, substantially as and for the purposes set forth.

10. A generator comprising heating-sections arranged one in advance of the other, each section being formed with a fluid-heating chamber, and having their sides which are arranged adjacent to one another, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, angularly or similarly arranged surfaces at the end of each heating-section, a shell or casing against the ends of said heating-sections, to provide vertically-arranged and upwardly-extending flues or passage-ways at the ends of said assembled heating-sections, and a shell or casing above said heating-sections, arranged to provide a chamber above said sections, substantially as and for the purposes set forth.

11. A generator comprising heating-sections arranged one in advance of the other, each section being formed with a fluid-heating chamber, and having their sides which are arranged adjacent to one another, tapering vertically, to provide vertically-arranged flues or fire-passages, between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, angularly or similarly arranged surfaces at the end of each heating-section, a perforated shell or casing against the ends of said heating-sections, a covering of asbestos cement, or the like, over said perforated shell or casing, arranged to provide vertical and upwardly-extending flues or passage-ways at the ends of said assembled heating-sections, a perforated shell or casing above said heating-sections, and a covering of asbestos cement, or the like, over said shell or casing, arranged to provide a chamber above said sections, substantially as and for the purposes set forth.

12. A generator comprising upright heating-sections, arranged one in advance of the other, each section being formed with a fluid-heating chamber, and having their sides which are arranged adjacent to one another, provided with vertically-disposed channels or angularly-formed surfaces, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, and vertically-arranged and upwardly-extending flues or passage-ways at the ends of said assembled heating-sections, substantially as and for the purposes set forth.

13. A generator comprising upright heating-sections, arranged one in advance of the other, each section being formed with a fluid-heating chamber, and having their sides which are arranged adjacent to one another, provided with vertically-disposed channels or angularly-formed surfaces, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, angularly or similarly arranged surfaces at the ends of each heating-section, and a shell or casing against said ends of the heating-sections, to provide vertically-arranged and upwardly-extending flues or passage-ways at the ends of said assembled heating-sections, substantially as and for the purposes set forth.

14. A generator comprising upright heating-sections, arranged one in advance of the other, each section being formed with a fluid-heating chamber, and having their sides which are arranged adjacent to one another, provided with vertically-disposed channels or angularly-formed surfaces, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, angularly or similarly arranged surfaces at the ends of each heating-section, a perforated shell or casing against said ends of the heating-sections, a covering of asbestos cement, or the like, over said perforated shell or casing, all arranged to provide vertical and upwardly-extending flues or passage-ways at the ends of said assembled heating-sections, substantially as and for the purposes set forth.

15. A generator comprising upright heating-sections, arranged one in advance of the other, each section being formed with a fluid-heating chamber, and having their sides which are arranged adjacent to one another, provided with vertically-disposed channels or angularly-formed surfaces, tapering vertically, to provide vertically-arranged flues or fire-passages between said heating-sections, said flues or passages having a larger cross-area at their lowest points than at their highest points, laterally-extending or horizontal flues or passage-ways near the top of said heating-section, in communication with said vertical flues, downwardly-extending flues or ducts near the ends of said horizontal flues, angularly or similarly arranged surfaces at the ends of each heating-section, a shell or casing against the ends of said heating-sections, to provide vertically-arranged and upwardly-extending flues or passage-ways at the ends of said assembled heating-sections, and a shell or casing above said heating-sections, arranged to provide a chamber above said sections, substantially as and for the purposes set forth.

16. A generator comprising upright heating-sections, arranged one in advance of the other, each section being formed with a fluid-heating chamber, and having their sides which are arranged adjacent to one another, provided with vertically-disposed channels or angularly-formed surfaces, tapering vertically, to provide vertically-arranged flues or fire-passages between said heating-sections, said flues or passages having a larger cross-area at their lowest points than at their highest points, laterally-extending or horizontal flues or passage-ways near the top of said heating-sections, in communication with said vertical flues, downwardly-extending flues or ducts near the ends of said horizontal flues, angularly or similarly arranged surfaces at the ends of each heating-section, a perforated shell or casing against the ends of said heating-sections, a covering of asbestos cement, or the like, over said perforated shell or casing, arranged to provide vertical and upwardly-extending flues or passage-ways at the ends of said assembled heating-sections, a perforated shell or casing above said heating-sections, and a covering of asbestos cement, or the like, over said shell or casing, arranged to provide a chamber above said sections, substantially as and for the purposes set forth.

In testimony that I claim the invention set forth above I have hereunto set my hand this 3d day of June, 1899.

WARD TEMPLE MIXSELL.

Witnesses:
FREDK. C. FRAENTZEL,
MELVILLE H. MIXSELL.